US012119198B2

(12) United States Patent
Singh et al.

(10) Patent No.: US 12,119,198 B2
(45) Date of Patent: Oct. 15, 2024

(54) MOVABLE BRACKET INTERLOCKING MATING CONNECTORS WITH SWITCH ACTIVATION

(71) Applicant: Applied Materials, Inc., Santa Clara, CA (US)

(72) Inventors: Vijay Singh, Bangalore (IN); Kumaresan Nagarajan, Bengaluru (IN); Adarsh Balareddy, Bangalore (IN)

(73) Assignee: APPLIED MATERIALS, INC., Santa Clara, CA (US)

( * ) Notice: Subject to any disclaimer, the term of this patent is extended or adjusted under 35 U.S.C. 154(b) by 366 days.

(21) Appl. No.: 17/861,792

(22) Filed: Jul. 11, 2022

(65) Prior Publication Data

US 2024/0013987 A1 Jan. 11, 2024

(51) Int. Cl.
*H01H 9/02* (2006.01)

(52) U.S. Cl.
CPC .................................. *H01H 9/0271* (2013.01)

(58) Field of Classification Search
CPC .................... H01H 9/0271; H01H 9/22; E05B 2063/0026; H01R 13/7035
See application file for complete search history.

(56) References Cited

U.S. PATENT DOCUMENTS

| | | | | |
|---|---|---|---|---|
| 5,554,893 A * | 9/1996 | Oku | H01R 13/7035 307/119 |
| 5,879,176 A * | 3/1999 | Stimson | H01R 13/7035 200/51.09 |
| 6,053,756 A | 4/2000 | Flanigan et al. | |
| 10,263,370 B2 | 4/2019 | Condo et al. | |
| 2018/0062306 A1 | 3/2018 | Juds et al. | |

FOREIGN PATENT DOCUMENTS

| | | |
|---|---|---|
| DE | 202006003433 U1 | 7/2007 |
| EP | 1930997 A1 | 6/2008 |
| WO | WO 2021/144146 A1 | 7/2021 |

* cited by examiner

*Primary Examiner* — Vanessa Girardi
(74) *Attorney, Agent, or Firm* — MOSER TABOA

(57) ABSTRACT

In embodiments, systems and apparatus comprise a bracket having a through hole configured to receive a first connector connected to a panel spaced from the bracket, the bracket movable between first and second positions; a switch mountable on the panel, the switch having first and second switch positions; and at least one compression spring extending from the bracket to bias the bracket into the first position spaced away from the switch. When the bracket is in the first position, the switch is in the first switch position, and when the bracket is in the second position, the bracket engages and actuates the switch into the second switch position. The bracket is movable into the second position to engage and actuate the switch by coupling a second connector to the first connector. The switch is configured to trigger a signal indicating that the first connector is connected to the second connector.

20 Claims, 3 Drawing Sheets

MOVABLE BRACKET INTERLOCKING MATING CONNECTORS WITH SWITCH ACTIVATION

FIELD

Embodiments of the present disclosure generally relate to an interlock for a device and, more particularly, an interlock for verifying a connection.

BACKGROUND

Some interlock mechanisms have been used to verify whether a cable connector is fully connected to equipment and, if not fully connected, to disable functionality of the equipment. A leaf spring has been used in some interlock mechanisms to actuate a switch responsible for triggering an interlock signal to control operation of substrate processing chambers (e.g. semiconductor physical vapor deposition (PVD) chamber). For example, in some examples, the interlock signal is used to control a supply of radio frequency (RF) power to the substrate processing chamber based on whether an RF cable is fully connected to the substrate processing chamber. However, over time the leaf spring may deform, which may affect actuation of the switch and reliability of the interlock mechanism.

SUMMARY

Methods, systems, and apparatus for interlocking a device, as well as an interlocked device, are provided herein. According to some embodiments, an apparatus for interlocking a device comprises: a bracket having a through hole configured to receive a first connector therethrough, the first connector being connected to a panel spaced from the bracket, the bracket movable between a first position and a second position; a switch mountable on the panel, the switch having a first switch position and a second switch position; and at least one compression spring extending from the bracket to bias the bracket into the first position spaced away from the switch, wherein the bracket is configured to operatively engage and disengage the switch, wherein when the bracket is in the first position spaced away from the switch, the switch is in the first switch position, and when the bracket is in the second position, the bracket engages and actuates the switch into the second switch position, wherein the bracket is movable against the bias of the at least one compression spring into the second position to engage and actuate the switch into the second switch position by coupling a second connector to the first connector, and wherein the switch is configured to trigger a signal indicating that the first connector is connected to the second connector when the switch is in the second switch position.

Also, according to some embodiments, a system for interlocking a device comprises: a first connector mounted to a panel; a bracket having a through hole configured to receive the first connector therethrough; a switch mounted on the panel, the switch having a first switch position and a second switch position; and at least one compression spring extending between the bracket and the panel to bias the bracket into a first position spaced away from the switch, wherein the bracket is configured to operatively engage and disengage the switch, wherein when the bracket is in the first position spaced away from the switch, the switch is in the first switch position, and when the bracket is in a second position, the bracket engages and actuates the switch into the second switch position, wherein the bracket is movable against the bias of the at least one compression spring into the second position to engage and actuate the switch into the second switch position by coupling a second connector to the first connector, and wherein the switch is configured to trigger a signal indicating that the first connector is connected to the second connector when the switch is in the second switch position.

According to some embodiments, an interlocked device comprises: an interlock system comprising: a first connector mounted to a panel; a bracket having a through hole configured to receive the first connector therethrough; a switch mounted on the panel, the switch having a first switch position and a second switch position; and at least one compression spring extending between the bracket and the panel to bias the bracket into a first position spaced away from the switch, wherein the bracket is configured to operatively engage and disengage the switch, wherein when the bracket is in the first position spaced away from the switch, the switch is in the first switch position and when the bracket is in a second position, the bracket engages and actuates the switch into the second switch position, wherein the bracket is movable against the bias of the at least one compression spring into the second position to engage and actuate the switch into the second switch position by coupling a second connector to the first connector, and wherein the switch is configured to trigger a signal indicating that the first connector is connected to the second connector when the switch is in the second switch position; and a device configurable between a first configuration and a second configuration based on receipt of the signal.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

Figure 1:
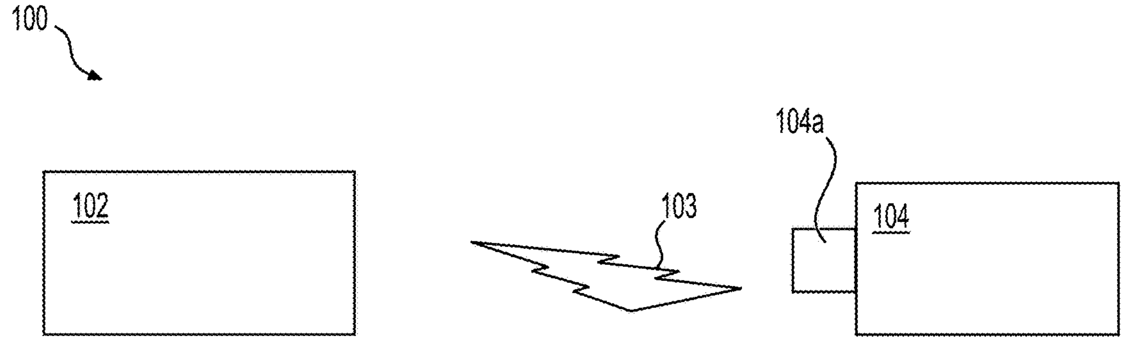
FIG. 1 is a schematic view of an interlocked device in accordance with at least one embodiment of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of an apparatus, system, and method for interlocking a device, as well as an interlocked device, are provided herein. In some embodiments, the operation of a device (e.g., a substrate processing chamber), may be interlocked or otherwise controlled based at least on whether a connector (e.g., a radio frequency (RF) connector) is connected (e.g., to the substrate processing chamber or other equipment). Such control of the device may be useful to protect the device and/or personnel from a hazard or other unwanted condition.

For example, in some embodiments, physical vapor deposition (PVD) chambers may use RF signals to enhance substrate (e.g., semiconductor) processing. For example, some systems may use multiple RF signals, such as a bias RF power, for example applied to an electrode disposed beneath a substrate, and a source RF power, for example applied to an electrode disposed in or near an upper region of the process chamber. The bias RF power may be used, for example, to control a DC bias formed on the substrate during processing and the source RF power may be used, for example, to form a plasma. RF power may be supplied to a PVD chamber through an RF cable having a connector connected to a mating connector of the PVD chamber. If the RF cable is not fully connected to the PVD chamber, energizing the RF cable and/or operating the PVD chamber may be hazardous to the PVD chamber, other equipment, and/or personnel. Thus, in some embodiments, the operation of the PVD chamber and/or the RF power source for energizing the RF cable may be interlocked or otherwise controlled to prevent operation of the PVD chamber and/or prevent energizing the RF cable if the RF cable is not fully connected to the PVD chamber and to allow operation of the PVD chamber and/or to energize the RF cable if the RF cable is fully connected to the PVD chamber.

In some embodiments, and as shown in FIG. 1, an interlocked device 100 includes an interlock system 102 and a device 104. The device 104 (e.g., a substrate processing chamber) is configurable between a first configuration (e.g., power off, not ready to provide power, not ready for processing and a second configuration (e.g., power on, ready to provide power, ready for processing) based on receipt of a signal 103 triggered by the interlock system 102. In some embodiments, the signal 103 may be routed to a controller **104*a* configured to control operation of the device 104 based in part upon receipt of the signal 103. The controller 104*a* may be a part of the device 104** or another device (not shown).

Figure 2:
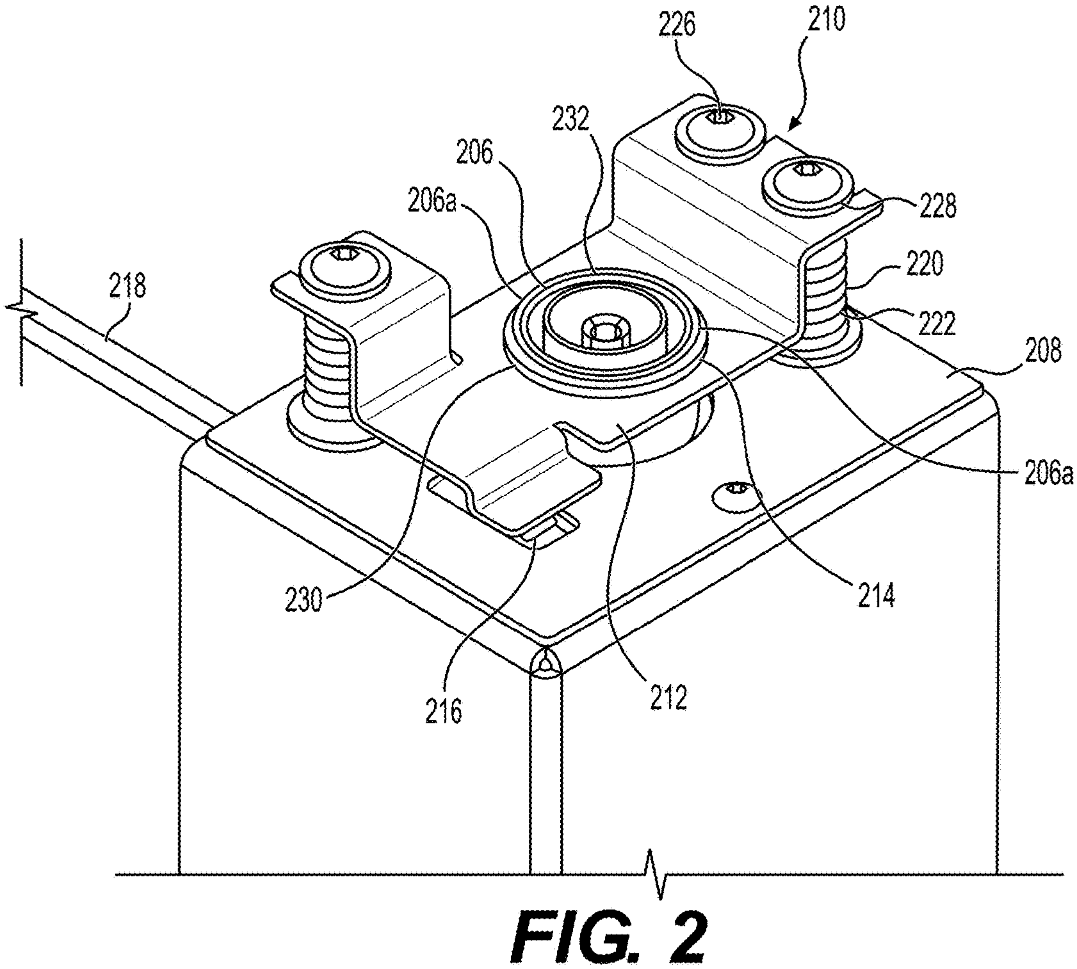
FIG. 2 is an isometric view of an interlock system in a first configuration in accordance with at least one embodiment of the present disclosure.
Figure 3:
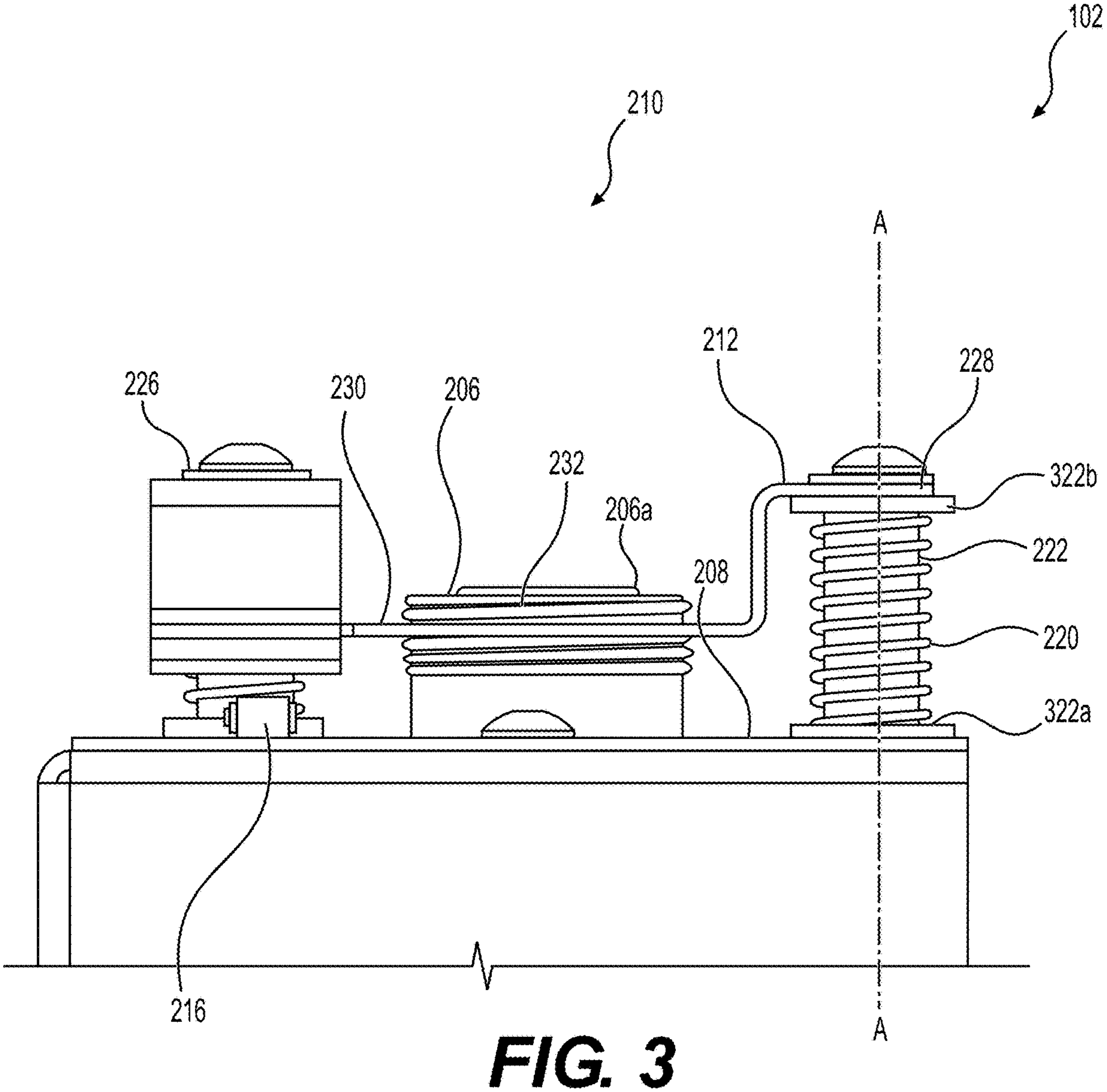
FIG. 3 is an elevation view of the interlock system of FIG. 2.
Figure 4:
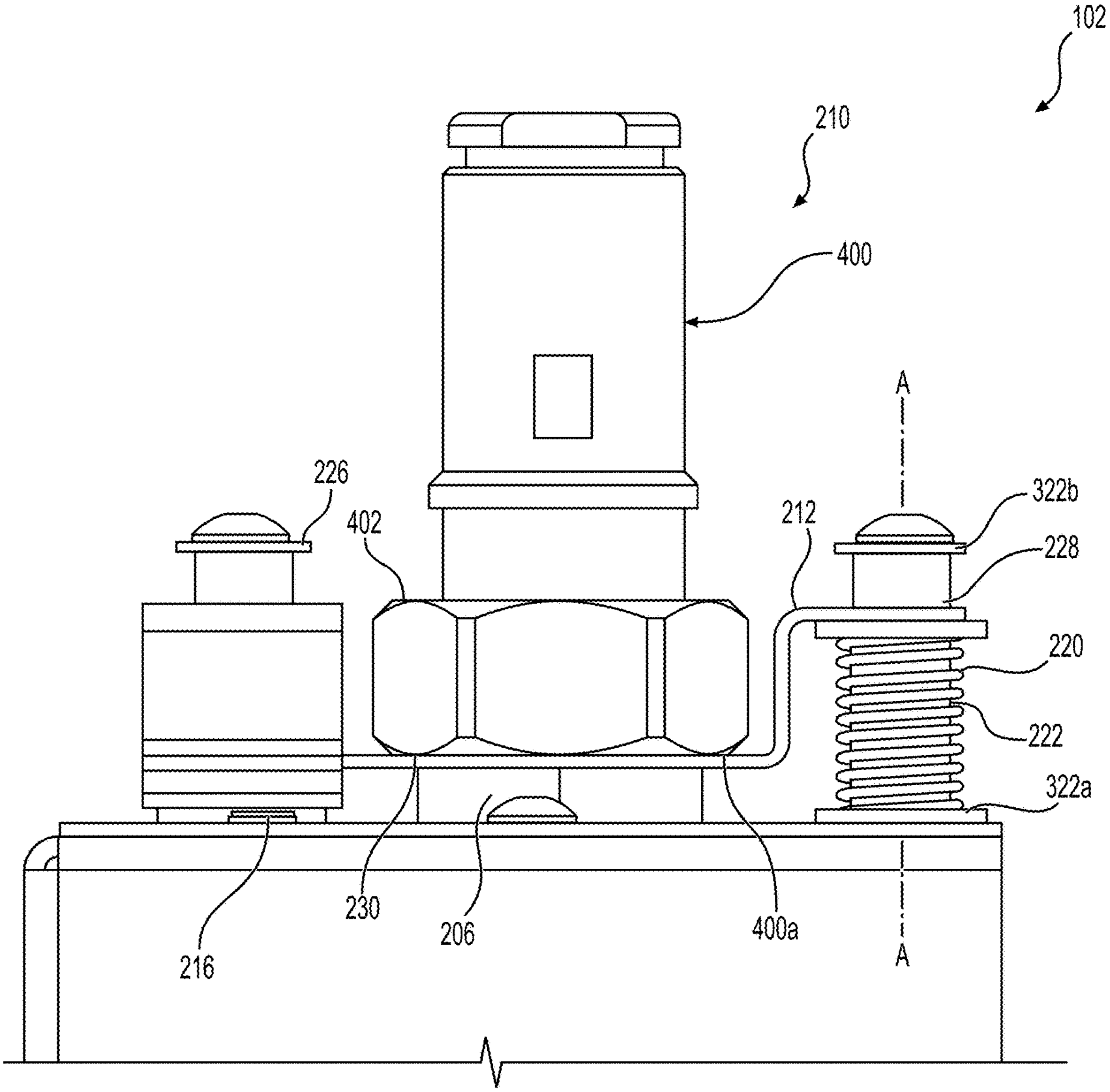
FIG. 4 is an elevation view of the interlock system of FIG. 2 in a second configuration.

In some embodiments, and as shown in FIGS. 2-4, the interlock system 102 may include a first connector 206 mounted or otherwise connected to a panel 208 (e.g., an electrical panel, fluid panel) and an interlock apparatus 210 for interlocking the device 104. As discussed herein, in some embodiments, the interlock apparatus 210 includes at least one compression spring 220, which may improve reliability of the interlock apparatus 210 in comparison to the aforementioned interlock mechanism that uses a leaf spring.

According to some embodiments, and as shown most clearly in FIG. 2, the interlock apparatus 210 may include a bracket 212 having a through hole 214 configured to receive the first connector 206 therethrough. The panel 208 is spaced from the bracket 212. In some embodiments, and as shown in FIG. 4, the first connector 206 may be configured to connect to a second connector 400. In some embodiments, the first connector 206 and the second connector 400 may be electrical connectors (e.g., RF connectors). In some embodiments, the first connector 206 and the second connector 400 may be fluid connectors for gases and liquids (e.g., water). Such fluids may be toxic or non-toxic. Thus, in some embodiments, the interlock system 102 may be configured as an interlock for controlling a flow of fluid through the first connector 206 and the second connector 400. In some embodiments, the bracket 212 may be movable between a first position shown in FIGS. 2 and 3, and a second position shown in FIG. 4. In some embodiments, and a shown in FIGS. 2 and 3, an end **206*a* of the first connector 206 extends through the through hole 214 in the bracket 212**.

Also, in some embodiments, and as shown in FIGS. 2-4, the interlock apparatus 210 may include a switch 216 mountable on the panel 208. In some embodiments, the switch 216 may be a snap switch. In some embodiments, the switch 216 may have a first switch position shown in FIGS. 2 and 3, and a second switch position shown in FIG. 4. In some embodiments, the switch 216 may be biased to the first switch position. In some embodiments, the switch 216 may be connected to a circuit 218 (FIG. 2). In some embodiments, the switch 216 may be configured to trigger the signal 103, which may be transmitted through the circuit 218, indicating that the first connector 206 is connected to the second connector 400 when the switch 216 is in the second switch position. In some embodiments, the switch 216 may be configured to not trigger the signal 103 when the switch 216 is in the first switch position.

In some embodiments, the bracket 212 may be configured to operatively engage and disengage the switch 216. In some embodiments, and as shown in FIGS. 2 and 3, when the bracket 212 is in the first position, the bracket 212 may be spaced away from the switch 216 and the switch 216 is in the first switch position. In some embodiments, and as shown in FIG. 4, when the bracket 212 is in the second position, the bracket 212 may engage and actuate the switch 216 into the second switch position.

In some embodiments, and as shown in FIGS. 2 and 3, the interlock apparatus 210 may also include at least one compression spring 220 extending from the bracket 212 to bias the bracket 212 into the first position spaced away from the switch 216. In some embodiments, and as shown in FIG. 4, the bracket 212 may be movable against the bias of the at least one compression spring 220 into the second position to engage and actuate the switch 216 into the second switch position by coupling the second connector 400 to the first connector 206.

In some embodiments, and as shown in FIGS. 2-4, the interlock apparatus 210 may include at least one standoff 222 having a first end **322*a* configured to connect to the panel 208 and a stop 226 extending from a second end 322*b* of the standoff 222. The at least one standoff 222 may extend through the at least one corresponding compression spring 220 and through an opening 228 (FIG. 3) in the bracket 212. In some embodiments, and as shown in FIGS. 2-4, the bracket 212 may be disposed between an upper end of the compression spring 220 and the stop 226 so that the bracket 212 and the upper end of the compression spring 220 move together due to the spring bias. In some embodiments, the bracket 212 may be configured to slide along the standoff 222 between the first end 322*a* and the second end 322*b***.

In some embodiments, and as shown in FIGS. 2-4, the interlock apparatus 210 may include a plurality of the compression springs 220 (three compression springs are shown) spaced around the first connector 206, and a plurality of the standoffs 222 (three standoffs are shown) and stops 226 (three stops are shown), with the standoffs 222 extending through corresponding compression springs 220 of the plurality of compression springs 220. In at least one embodiment, and as shown in FIGS. 2-4, the standoffs 222 are configured to guide the bracket 212 in translation between the first position and the second position along a generally linear path parallel to an axis A-A (FIGS. 3-4) extending perpendicular to the panel 208. In some embodiments, the stops 226 limit the spacing between the bracket 212 and the switch 216 in the first position of the bracket 212.

In some embodiments, and as shown in FIGS. 2-4, the plurality of compression springs 220 and standoffs 222 are spaced around the first connector 206. The plurality of spaced compression springs 220 and the plurality of spaced standoffs 222 may facilitate distributing forces on the bracket 212 to avoid rotation of the bracket 212 relative to the axis A-A (e.g., avoid a cantilever effect) as the bracket 212 moves between the first position and the second position. In some embodiments, the bracket 212 may be formed of a material (e.g., steel) having sufficient stiffness to prevent the bracket 212 from deforming (e.g., bending) from forces exerted on the bracket 212.

In some embodiments, the bracket 212 may be configured to move with a portion 402 (FIG. 4) of the second connector 400 from the first position to the second position as the first connector 206 is securely connected to the second connector 400. For example, in some embodiments, and as shown in FIGS. 2-4, the bracket 212 may have a bearing surface 230 around the through hole 214 configured to contact the portion 402 (FIG. 4) of the second connector 400 which is configured to securely connect with a portion 232 of the first connector 206. In some embodiments, and as shown in FIGS. 2 and 3, the portion 232 may have threads, and the portion 402 (e.g., a collar) may have threads to mate with the threads of the portion 232. In such embodiments, threading the portion 402 onto the portion 232 may cause the portion 402 to bear against the bearing surface 230 of the bracket 212, thereby moving the bracket 212 towards the switch 216 against the bias of the compression springs 220. Also, in such embodiments, due to the bias of the compression springs 220, unthreading the portion 402 from the portion 232 may cause the bracket 212 to move further away from and disengage the switch 216, allowing the switch 216 to return to the first switch position. In some embodiments, the portion 232 of the first connector 206 and the portion 402 of the second connector 400 may have other features configured for making a secure connection, including twist or snap features, while moving the bracket 212 from the first position to the second position to actuate the switch 216.

Thus, in some embodiments, the interlock apparatus 210 may be configured so that connecting the first connector 206 to the second connector 400 causes the bracket 212 to move towards the switch 216 to move the switch 216 from the first switch position to the second switch position, which, in turn, may trigger the signal 103 indicating that the first connector 206 is connected to the second connector 400. In some embodiments, the signal 103 may be used as a connection verification signal to interlock the device 104. For example, in some embodiments, receipt of the signal 103 may reconfigure the device 104 from a first configuration (e.g., power off, not ready to provide power, not ready for processing to a second configuration (e.g., power on, ready to provide power, ready for processing) to a second configuration. In addition, in some embodiments, discontinuing the signal 103 may reconfigure the device 104 from the second configuration (e.g., on) to the first configuration (e.g., off). In some embodiments, the signal 103 may be discontinued by disconnecting the second connector 400 from the first connector 206 to cause the bracket 212 to return to the first position and the switch 216 to return to the first switch position. In some embodiments, the signal 103 may be routed to the controller 104*a* to configure the device 104 at least based upon the signal 103.

According to some embodiments, the interlock apparatus 210 shown in FIGS. 2-4 may be used as follows to interlock the device 104. Initially, in the interlock apparatus 210 shown in FIGS. 2 and 3, the first connector 206 is disengaged and disconnected from the second connector 400 so that the switch 216 is in the first switch position and the device 104 is in a first configuration (e.g., off). An end 400*a* (FIG. 4) of the second connector 400 may then be aligned with and engage an end 206*a* (FIG. 1) of the first connector 206. In some embodiments, such engagement may include inserting the end 400*a* into a mating receptable at the end 206*a* of the first connector 206, or vice versa, which may functionally connect (e.g., electrically or fluidically connect) the first connector 206 to the second connector 400. With the first connector 206 and second connector 400 engaged, the first connector 206 may be securely connected to the second connector 400 by connecting the portion 232 of the first connector 206 to the portion 402 of the second connector to move the bracket 212 towards the switch 216 until the switch 216 is actuated in the second switch position. In some embodiments, actuating the switch 216 may trigger the signal 103. Also, in some embodiments, upon receipt of the signal 103, such as by the controller 104*a* or by the device 104, the device 104 may be reconfigured from the first configuration (e.g., off) to the second configuration (e.g., on). In some embodiments, the foregoing method can be reversed to discontinue triggering the signal 103 and to reconfigure the device 104 to the first configuration (e.g., off). For example, the controller 104*a* may be configured to reconfigure the device 104 when the signal 103 is not received by the controller 104*a*.

While the foregoing is directed to embodiments of the present disclosure, other and further embodiments of the disclosure may be devised without departing from the basic scope thereof.

The invention claimed is:

1. An apparatus for interlocking a device, the apparatus comprising:

- a bracket having a through hole configured to receive a first connector therethrough, the first connector being connected to a panel spaced from the bracket, the bracket movable between a first position and a second position;
- a switch mountable on the panel, the switch having a first switch position and a second switch position; and
- at least one compression spring extending from the bracket to bias the bracket into the first position spaced away from the switch,
- wherein the bracket is configured to operatively engage and disengage the switch,
- wherein when the bracket is in the first position spaced away from the switch, the switch is in the first switch position, and when the bracket is in the second position, the bracket engages and actuates the switch into the second switch position,
- wherein the bracket is movable against the bias of the at least one compression spring into the second position to engage and actuate the switch into the second switch position by coupling a second connector to the first connector, and
- wherein the switch is configured to trigger a signal indicating that the first connector is connected to the second connector when the switch is in the second switch position.

2. The apparatus of claim 1, wherein the bracket has a bearing surface around the through hole configured to contact a portion of the second connector which is configured to securely connect with the first connector, and wherein the bracket is configured to move with the portion of the second connector from the first position to the second position as the first connector is securely connected to the second connector.

3. The apparatus of claim 1, wherein the switch is biased to the first switch position.

4. The apparatus of claim 1, wherein the switch is configured to not trigger the signal when the switch is in the first switch position.

5. The apparatus of claim 1, further comprising:

at least one standoff having a first end configured to connect to the panel, the at least one standoff extending through the at least one compression spring and through an opening in the bracket; and a stop extending from a second end of each at least one standoff, wherein the bracket is disposed between the at least one compression spring and the stop, and wherein the bracket is configured to slide along the at least one standoff between the first end and the second end.

6. The apparatus of claim 5, comprising a plurality of the compression springs spaced around the first connector, and a plurality of the standoffs, each standoff extending through a corresponding compression spring of the plurality of the compression springs.

7. The apparatus of claim 6, wherein the plurality of the compression springs includes three compression springs and the plurality of the standoffs includes three standoffs.

8. A system for interlocking a device, comprising:

a first connector mounted to a panel;

a bracket having a through hole configured to receive the first connector therethrough;

a switch mounted on the panel, the switch having a first switch position and a second switch position; and at least one compression spring extending between the bracket and the panel to bias the bracket into a first position spaced away from the switch, wherein the bracket is configured to operatively engage and disengage the switch, wherein when the bracket is in the first position spaced away from the switch, the switch is in the first switch position, and when the bracket is in a second position, the bracket engages and actuates the switch into the second switch position, wherein the bracket is movable against the bias of the at least one compression spring into the second position to engage and actuate the switch into the second switch position by coupling a second connector to the first connector, and wherein the switch is configured to trigger a signal indicating that the first connector is connected to the second connector when the switch is in the second switch position.

9. The system of claim 8, wherein the bracket has a bearing surface around the through hole configured to contact a portion of the second connector which is configured to securely connect with the first connector, and wherein the bracket is configured to move with the portion of the second connector from the first position to the second position as the first connector is securely connected to the second connector.

10. The system of claim 8, wherein the switch is biased to the first switch position.

11. The system of claim 8, wherein the switch is configured to not trigger the signal when the switch is in the first switch position.

12. The system of claim 8, further comprising:

at least one standoff having a first end connected to the panel, the at least one standoff extending through the at least one compression spring and through an opening in the bracket; and a stop extending from a second end of each at least one standoff, wherein the bracket is disposed between the at least one compression spring and the stop, and wherein the bracket is configured to slide along the at least one standoff between the first end and the second end.

13. The system of claim 12, comprising a plurality of the compression springs spaced around the first connector and a plurality of the standoffs, each standoff extending through a corresponding compression spring of the plurality of the compression springs.

14. The system of claim 13, wherein the plurality of the compression springs includes three compression springs and the plurality of the standoffs includes three standoffs.

15. An interlocked device comprising:

an interlock system comprising:

a first connector mounted to a panel;

a bracket having a through hole configured to receive the first connector therethrough;

a switch mounted on the panel, the switch having a first switch position and a second switch position; and at least one compression spring extending between the bracket and the panel to bias the bracket into a first position spaced away from the switch, wherein the bracket is configured to operatively engage and disengage the switch, wherein when the bracket is in the first position spaced away from the switch, the switch is in the first switch position and when the bracket is in a second position, the bracket engages and actuates the switch into the second switch position, wherein the bracket is movable against the bias of the at least one compression spring into the second position to engage and actuate the switch into the second switch position by coupling a second connector to the first connector, and wherein the switch is configured to trigger a signal indicating that the first connector is connected to the second connector when the switch is in the second switch position; and a device configurable between a first configuration and a second configuration based on receipt of the signal.

16. The device of claim 15, wherein the bracket has a bearing surface around the through hole configured to contact a portion of a second connector which is configured to securely connect with the first connector, and wherein the bracket is configured to move with the portion of the second connector from the first position to the second position as the first connector is securely connected to the second connector.

17. The device of claim 15, wherein the first connector is an RF connector.

18. The device of claim 15, further comprising:

at least one standoff having a first end connected to the panel, the at least one standoff extending through the at least one compression spring and through an opening in the bracket; and a stop extending from a second end of each at least one standoff, wherein the bracket is disposed between the at least one compression spring and the stop, and wherein the bracket is configured to slide along the standoff between the first end and the second end.

19. The device of claim 18, comprising a plurality of the compression springs spaced around the first connector and a plurality of the standoffs, each standoff extending through a corresponding compression spring of the plurality of the compression springs.

20. The device of claim 19, wherein the plurality of the compression springs includes three compression springs and the plurality of the standoffs includes three standoffs.

* * * * *